US012695853B2

(12) United States Patent
Chien et al.

(10) Patent No.: US 12,695,853 B2
(45) Date of Patent: Jul. 28, 2026

(54) SOLID-STATE LIGHT SOURCE PROJECTOR WITH IMPROVED COLOR UNIFORMITY

(71) Applicant: QISDA CORPORATION, Taoyuan City (TW)

(72) Inventors: Chih-Shiung Chien, Taoyuan City (TW); Ming-Kuen Lin, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 68 days.

(21) Appl. No.: 19/011,545

(22) Filed: Jan. 6, 2025

(65) Prior Publication Data

US 2025/0240391 A1     Jul. 24, 2025

(30) Foreign Application Priority Data

Jan. 18, 2024   (CN) .......................... 202410073145.8

(51) Int. Cl.
*H04N 9/31*          (2006.01)
(52) U.S. Cl.
CPC ......... *H04N 9/3152* (2013.01); *H04N 9/3164* (2013.01)
(58) Field of Classification Search
None
See application file for complete search history.

(56) References Cited

U.S. PATENT DOCUMENTS

| | | | |
|---|---|---|---|
| 8,690,338 B2 | 4/2014 | Okumura | |
| 2009/0116107 A1* | 5/2009 | Kindler .................. | G03B 33/06 |
| | | | 359/457 |
| 2010/0110389 A1* | 5/2010 | Liao ....................... | G03B 21/14 |
| | | | 353/31 |
| 2023/0266650 A1* | 8/2023 | Li ........................ | G02B 26/008 |
| | | | 353/31 |
| 2024/0208111 A1* | 6/2024 | Twietmeyer ......... | G03B 21/142 |
| 2024/0369916 A1* | 11/2024 | Hori ....................... | G03B 21/00 |

FOREIGN PATENT DOCUMENTS

EP          2343588 A1     7/2011

* cited by examiner

*Primary Examiner* — Samira Monshi
(74) *Attorney, Agent, or Firm* — Winston Hsu

(57)          ABSTRACT

A solid-state light source projector includes a plurality of light sources for generating light of different colors, a first homogenizing device for dispersing the light of different colors to generate a plurality of scattered light beams, a first lens module for mixing the scattered light beams to generate a plurality of mixed light beams, a second homogenizing device for homogenizing the mixed light beams to generate a plurality of parallel light beams, a light collecting module for focusing the plurality of parallel light beams to generate a plurality of focused light beams, and a reflective module for reflecting the plurality of focused light beams to output uniform light beams. The light collecting module outputs the uniform light beams in parallel.

17 Claims, 5 Drawing Sheets

SOLID-STATE LIGHT SOURCE PROJECTOR WITH IMPROVED COLOR UNIFORMITY

BACKGROUND OF THE INVENTION

1. Field of the Invention

The present invention is related to a solid-state light source projector, in particular, a solid-state light source projector with improved color uniformity.

2. Description of the Prior Art

In recent years, solid-state light source projectors, which use laser projection light sources, have gradually transitioned from professional applications to general household use. Laser light sources can provide high brightness, and their lifespan can reach approximately 20,000 hours, significantly reducing maintenance costs. Unlike traditional lamp projectors that require cooling time when switching on and off, laser projectors can start up instantly, significantly improving work efficiency. They also offer significant flexibility in installation as they are not restricted by direction. However, due to technical and cost considerations, laser light source projectors are generally more expensive, making it challenging to replace traditional projection light sources in the short term.

A projector is structurally divided into a light source system, a lighting system, and an imaging system. The light source system provides a multi-color light source for the lighting system. Solid-state light source projectors using laser light sources often face the issue of uneven colors in the light source system. This is because the RGB laser light sources of the projector are emitted separately and are challenging to mix evenly. Therefore, there is a demand for a solid-state light source projector with improved color uniformity.

SUMMARY OF THE INVENTION

An embodiment provides a solid-state light source projector. The solid-state light source projector includes a plurality of light sources, a first homogenizing device, a first lens module, a second homogenizing device, a light collecting module and a reflective module. The plurality of light sources is used to generate light of different colors. The first homogenizing device is disposed on one side of the plurality of light sources and used to disperse the light of different colors to generate a plurality of scattered light beams. The first lens module is disposed on one side of the first homogenizing device and used to mix the scattered light beams to generate a plurality of mixed light beams. The second homogenizing device is disposed on one side of the first lens module and used to homogenize the mixed light beams to generate a plurality of parallel light beams. The light collecting module is disposed on one side of the second homogenizing device and used to focus the plurality of parallel light beams to generate a plurality of focused light beams. The reflective module is disposed on one side of the light collecting module and used to reflect the plurality of focused light beams to output uniform light beams. The light collecting module outputs the uniform light beams in parallel.

Another embodiment provides a solid-state light source projector. The solid-state light source projector includes a plurality of light sources, a first homogenizing device, a first lens module, a reflective component, a second lens module, a second homogenizing device, a light collecting module and a reflective module. The plurality of light sources is used to generate light of different colors. The first homogenizing device is disposed on one side of the plurality of light sources and used to disperse the light of different colors to generate a plurality of scattered light beams. The first lens module is disposed on one side of the first homogenizing device and used to mix the plurality of scattered light beams to generate a plurality of first mixed light beams. The reflective component is disposed on one side of the first lens module and used to reflect the plurality of first mixed light beams. The second lens module is disposed on one side of the reflective component and used to mix the plurality of first mixed light beams to generate a plurality of second mixed light beams. The second homogenizing device is disposed on one side of the second lens module and used to homogenize the plurality of second mixed light beams to generate a plurality of parallel light beams. The light collecting module is disposed on one side of the second homogenizing device and used to focus the plurality of parallel light beams to generate a plurality of focused light beams. The reflective module is disposed on one side of the light collecting module and used to reflect the focused light beams to output uniform light beams.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
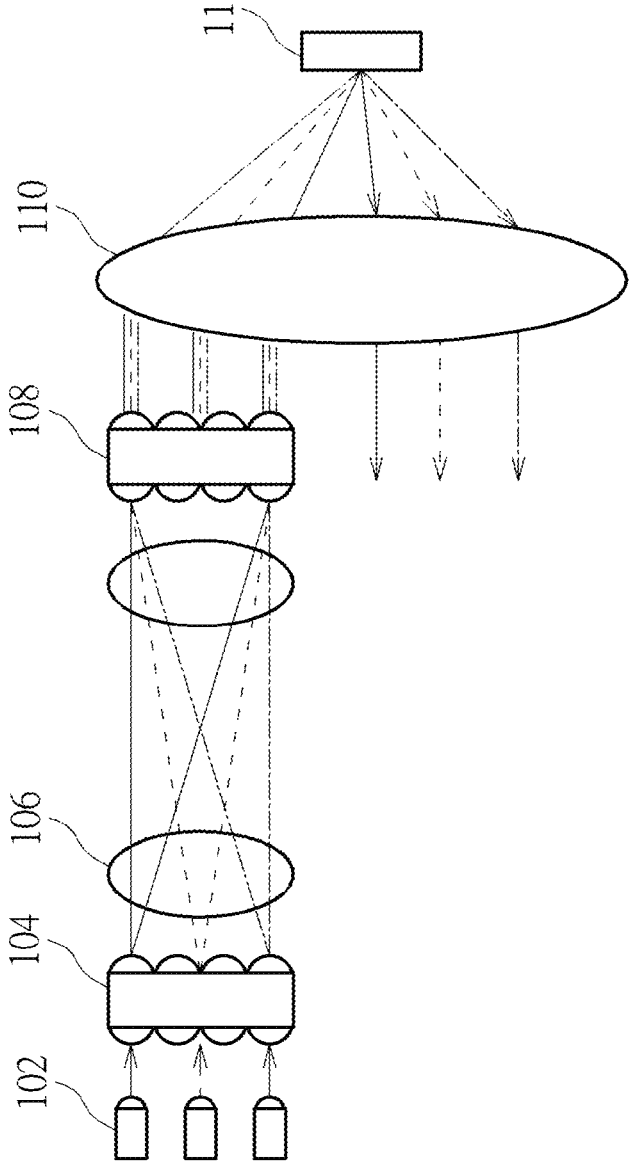
FIG. 1 is a schematic diagram of a solid-state light source projector according to an embodiment of the present invention.
Figure 1:
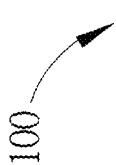

FIG. 1 is a schematic diagram of a solid-state light source projector 100 according to an embodiment of the present invention. The solid-state light source projector 100 includes a plurality of light sources 102, a first homogenizing device 104, a first lens module 106, a second homogenizing device 108, a light collection module 110 and a reflective module 112. The plurality of light sources 102 are used to generate light of different colors. The first homogenizing device 104 is disposed on one side of the plurality of light sources 102 for dispersing the light of different colors to generate a plurality of scattered light beams. In an embodiment, the first homogenizing device 104 can be a light pipe, a solid light pipe, a single-sided lens array or a double-sided lens array. The first lens module 106 is disposed on one side of the first homogenizing device 104 for mixing the scattered light beams to generate a plurality of mixed light beams. The second homogenizing device 108 is disposed on one side of the first lens module 106 to homogenize the mixed light beams to generate a plurality of parallel light beams. The second homogenizing device 108 can be a light pipe, a solid light pipe, a single-sided lens array or a double-sided lens array. The light collecting module 110 is disposed on one side of the second homogenizing device 108 for focusing the parallel light beams to generate a plurality of focused light beams. The reflective module 112 is disposed on one side of the light collecting module 110 to reflect the focused light beams to output uniform light beams, and the light collecting module 110 outputs the uniform light beams in parallel. In an embodiment, the reflective module 112 includes a diffuser. In another embodiment, the reflective module 112 is a stationary, moving or rotating device. Through the combined action of the first homogenizing device 104, the first lens module 106, and the second homogenizing device 108, the light of different colors (such as red, green, and blue) generated by the plurality of light sources 102 can be evenly mixed. The light collecting module 110 works in conjunction with the reflective module 112 to alter the direction of the light, thereby effectively utilizing the internal space of the solid-state light source projector 100.

Figure 2:
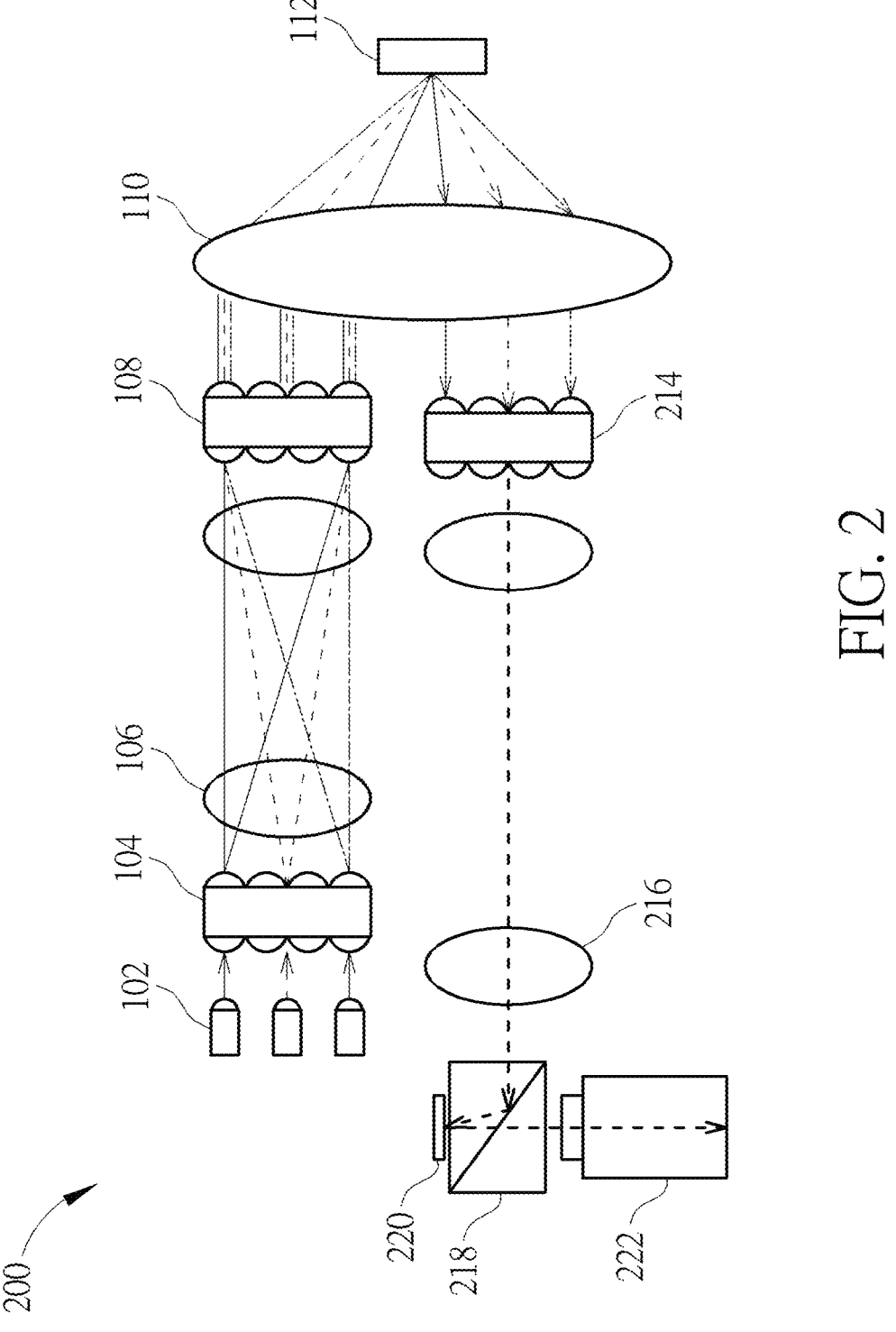
FIG. 2 is a schematic diagram of a solid-state light source projector according to another embodiment of the present invention.

FIG. 2 is a schematic diagram of a solid-state light source projector 200 according to another embodiment of the present invention. Compared with the solid-state light source projector 100, the solid-state light source projector 200 further includes a third homogenizing device 214, a second lens module 216, a prism module 218, a digital micro-mirror device (DMD) 220 and a camera lens 222. The third homogenizing device 214 is disposed on another side of the light collecting module 110 to homogenize the uniform light transmitted from the light collecting module 110 to generate a white light beam. The third homogenizing device 214 may be a light pipe, a solid light pipe, a single-sided lens array or a double-sided lens array. The second lens module 216 is disposed on one side of the third homogenizing device 214 for emitting the white light beam. The prism module 218 is disposed on one side of the second lens module 216 to reflect the white light beam. The DMD 220 is disposed on one side of the prism module 218 to modulate the white light beam to generate a modulated light beam and an image. The camera lens 222 is disposed on another side of the prism module 218 for outputting the modulated light beam. The modulated light beam passes through the prism module 218 and is directed towards the camera lens 222, enabling the camera lens 222 to project an image.

Figure 3:
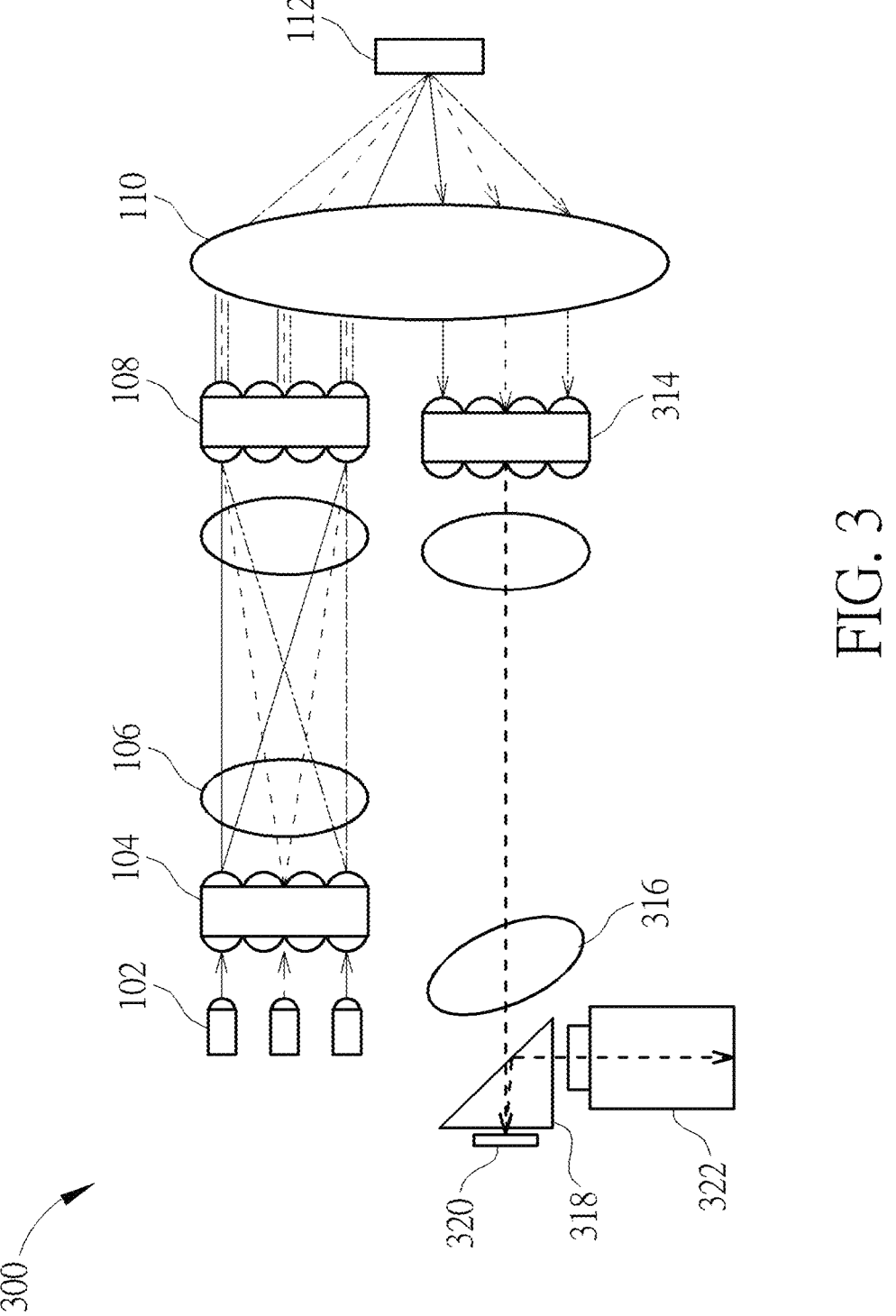
FIG. 3 is a schematic diagram of a solid-state light source projector according to another embodiment of the present invention.

FIG. 3 is a schematic diagram of a solid-state light source projector 300 according to another embodiment of the present invention. Compared with the solid-state light source projector 100, the solid-state light source projector 300 further includes a third homogenizing device 314, a second lens module 316, a prism module 318, a DMD 320 and a camera lens 322. The third homogenizing device 314 is disposed on another side of the light collecting module 110 to homogenize the uniform light transmitted from the light collecting module 110 to generate a white light beam. The third homogenizing device 314 can be a light pipe, a solid light pipe, a single-sided lens array or a double-sided lens array. The second lens module 316 is disposed on one side of the third homogenizing device 314 for emitting the white light beam. The prism module 318 is disposed on one side of the second lens module 316 to pass through the white light beam. The DMD 320 is provided on one side of the prism module 318 to modulate the white light beam to generate a modulated light beam and an image. The camera lens 322 is disposed on another side of the camera module

318 for outputting the modulated light beam. The camera module 318 reflects the modulated light beam to the lens 322.

Figure 4:
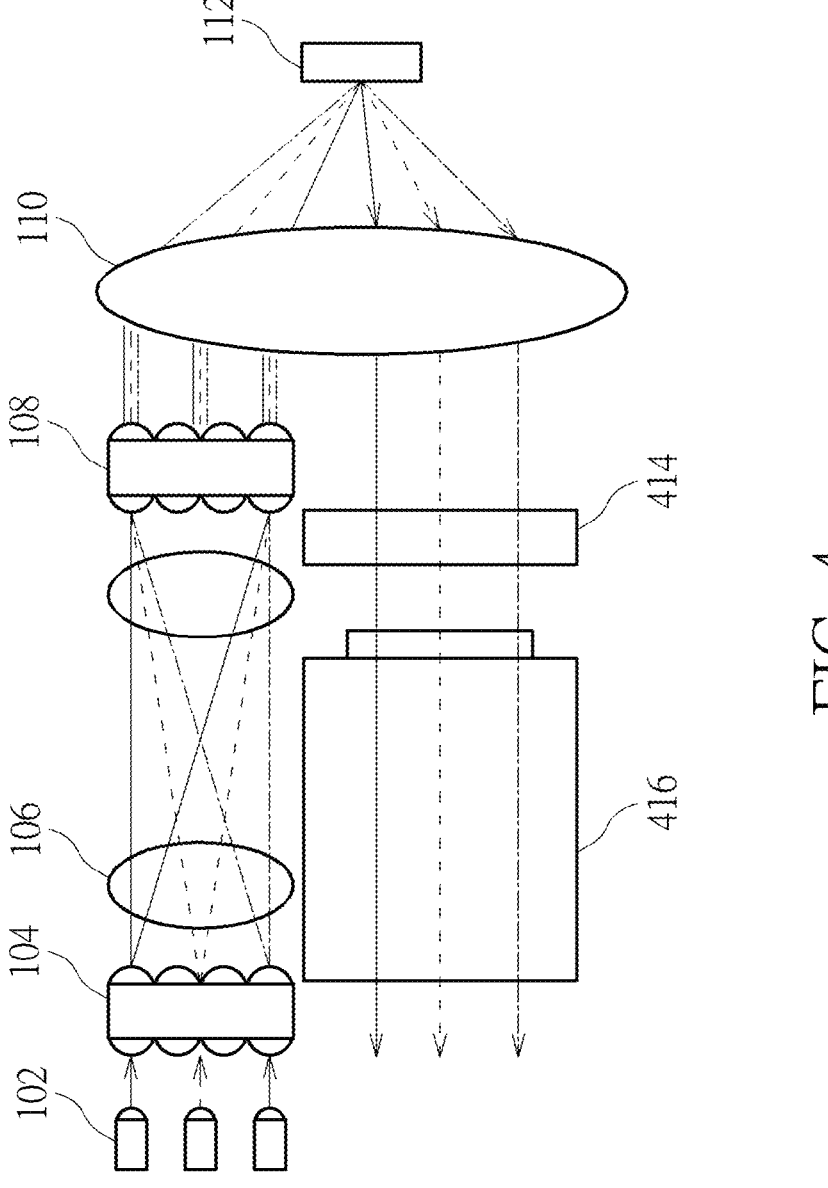
FIG. 4 is a schematic diagram of a solid-state light source projector according to another embodiment of the present invention.
Figure 4:
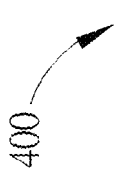

FIG. 4 is a schematic diagram of a solid-state light source projector 400 according to another embodiment of the present invention. Compared with the solid-state light source projector 100, the solid-state light source projector 400 further includes a penetrative panel module 414 and a camera lens 416. The penetrative panel module 414 is disposed on another side of the light collecting module 110 to modulate the uniform light beam transmitted from the light collecting module 110 to generate a modulated light beam. The camera lens 416 is disposed on one side of the penetrative panel module 414 for outputting the modulated light beam. The function of the penetrative panel module 414 is the same as that of the DMD 320, both of which are used to generate images.

Figure 5:
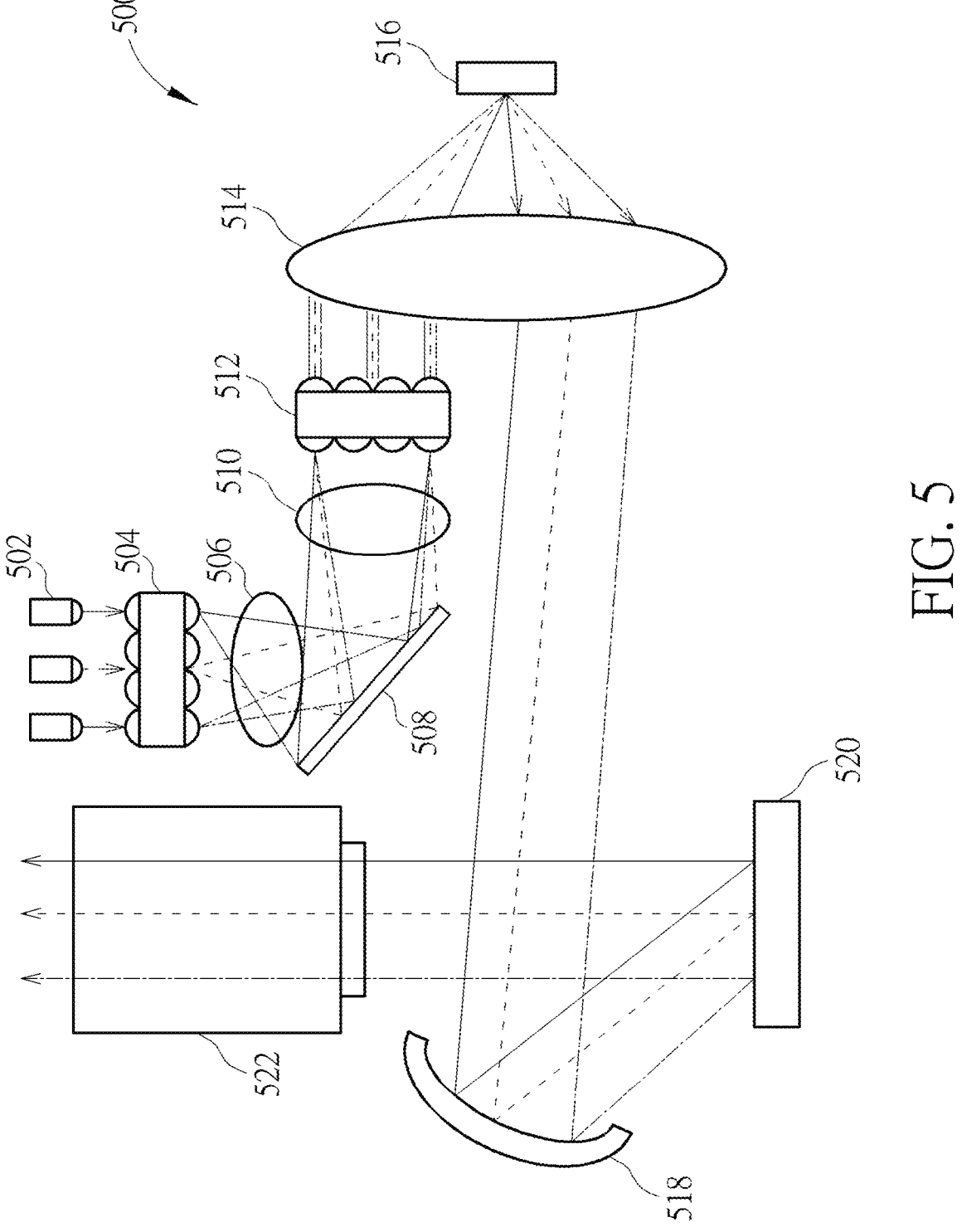
FIG. 5 is a schematic diagram of a solid-state light source projector according to another embodiment of the present invention.

FIG. 5 is a schematic diagram of a solid-state light source projector 500 according to another embodiment of the present invention. The solid-state light source projector 500 includes a plurality of light sources 502, a first homogenization device 504, a first lens module 506, a reflective component 508, a second lens module 510, a second homogenization device 512, a light collecting module 514, a reflective module 516, a concave mirror module 518, a DMD 520 and a camera lens 522. The plurality of light sources 502 are used to generate light of different colors. The first homogenizing device 504 is disposed on one side of the plurality of light sources 502 for dispersing the light of different colors to generate a plurality of scattered light beams. In an embodiment, the first homogenizing device 504 can be a light pipe, a solid light pipe, a single-sided lens array or a double-sided lens array. The first lens module 506 is disposed on one side of the first homogenizing device 504 for mixing the scattered light beams to generate a plurality of first mixed light beams. The reflective component 508 is disposed on one side of the first lens module 506 to reflect the plurality of first mixed light beams. The second lens module 510 is disposed on one side of the reflective component 508 to mix the plurality of reflected first mixed light beams to generate a plurality of second mixed light beams. The second homogenizing device 512 is disposed on one side of the second lens module 510 to homogenize the plurality of second mixed light beams to generate a plurality of parallel light beams. The second homogenizing device 512 may be a light pipe, a solid light pipe, a single-sided lens array or a double-sided lens array. The light collecting module 514 is disposed on one side of the second homogenizing device 512 for focusing the plurality of parallel light beams to generate a plurality of focused light beams. The reflective module 516 is disposed on one side of the light collecting module 514 to reflect the plurality of focused light beams to output a plurality of uniform light beams, and the light collecting module 514 outputs the plurality of uniform light beams in parallel. The concave mirror module 518 is disposed on another side of the light collecting module 514 to focus the plurality of uniform light beams from the light collecting module 110 to generate a plurality of focused light beams. The DMD 520 is disposed on one side of the concave mirror module 518 to modulate the plurality of focused light beams to generate a modulated light beam to form an image. The camera lens 522 is disposed on one side of the DMD 520 for outputting the modulated light beam. The solid-state light source projector 500 uses the reflective component 508 to position the camera lens 522 facing upward, properly utilizing the space of the solid-state light source projector 500. The use of the concave mirror module 518 can reduce the number of components in the solid-state light source projector 500. In an embodiment, the concave mirror module 518, the DMD 520 and the camera lens 522 can be substituted with the structure of the solid-state light source projectors 200, 300, 400, which would also serve the purpose of enhancing color uniformity.

Through the embodiments shown in the present invention, the solid-state light source projectors 100, 200, 300, 400, and 500 can evenly blend various colors of light, thereby achieving the objective of enhancing color uniformity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A solid-state light source projector, comprising:
   a plurality of light sources, configured to generate light of different colors;
   a first homogenizing device, disposed on one side of the plurality of light sources, and configured to disperse the light of different colors to generate a plurality of scattered light beams;
   a first lens module, disposed on one side of the first homogenizing device, and configured to mix the scattered light beams to generate a plurality of mixed light beams;
   a second homogenizing device, disposed on one side of the first lens module, and configured to homogenize the mixed light beams to generate a plurality of parallel light beams;
   a light collecting module, disposed on one side of the second homogenizing device, and configured to focus the plurality of parallel light beams to generate a plurality of focused light beams; and
   a reflective module, disposed on one side of the light collecting module, and configured to reflect the plurality of focused light beams to output uniform light beams;
   wherein the light collecting module outputs the uniform light beams in parallel.

2. The solid-state light source projector of claim 1, wherein the first homogenizing device is a light pipe, a solid light pipe, a single-sided lens array or a double-sided lens array.

3. The solid-state light source projector of claim 1, wherein the second homogenizing device is a light pipe, a solid light pipe, a single-sided lens array or a double-sided lens array.

4. The solid-state light source projector of claim 1, wherein the reflective module comprises a diffuser.

5. The solid-state light source projector of claim 1, wherein the reflective module is a stationary, moving or rotating device.

6. The solid-state light source projector of claim 1, further comprising:
   a third homogenizing device, disposed on another side of the light collecting module, and configured to homogenize the uniform light beams to generate a white light beam;
   a second lens module, disposed on one side of the third homogenizing device, and configured to transmit the white light beam;
   a prism module, disposed on one side of the second lens module, and configured to reflect the white light beam;

a digital micro-mirror device (DMD), disposed on one side of the prism module, and configured to modulate the white light beam to generate a modulated light beam; and
   a camera lens, disposed on another side of the prism module, and configured to output the modulated light beam;
   wherein the modulated light beam is transmitted to the camera lens through the prism module.

7. The solid-state light source projector of claim 1, further comprising:
   a third homogenizing device, disposed on another side of the light collecting module, and configured to homogenize the uniform light beams to generate a white light beam;
   a second lens module, disposed on one side of the third homogenizing device, and configured to transmit the white light beam;
   a prism module, disposed on one side of the second lens module, and configured to allow the white light beam to pass through;
   a digital micro-mirror device (DMD), disposed on one side of the prism module, and configured to modulate the white light beam to generate a modulated light beam; and
   a camera lens, disposed on another side of the prism module, and configured to output the modulated light beam;
   wherein the modulated light beam is reflected to the camera lens by the prism module.

8. The solid-state light source projector of claim 1, further comprising:
   a penetrative panel module, disposed on another side of the light collecting module, and configured to modulate the uniform light beams to generate a modulated light beam; and
   a camera lens, disposed on one side of the penetrative panel module, and configured to output the modulated light beam.

9. A solid-state light source projector, comprising:
   a plurality of light sources, configured to generate light of different colors;
   a first homogenizing device, disposed on one side of the plurality of light sources, and configured to disperse the light of different colors to generate a plurality of scattered light beams;
   a first lens module, disposed on one side of the first homogenizing device, and configured to mix the plurality of scattered light beams to generate a plurality of first mixed light beams;
   a reflective component, disposed on one side of the first lens module, and configured to reflect the plurality of first mixed light beams;
   a second lens module, disposed on one side of the reflective component, and configured to mix the plurality of first mixed light beams to generate a plurality of second mixed light beams;
   a second homogenizing device, disposed on one side of the second lens module, and configured to homogenize the plurality of second mixed light beams to generate a plurality of parallel light beams;
   a light collecting module, disposed on one side of the second homogenizing device, and configured to focus the plurality of parallel light beams to generate a plurality of focused light beams; and a reflective module, disposed on one side of the light collecting module, and configured to reflect the focused light beams to output uniform light beams.

10. The solid-state light source projector of claim 9, wherein the first homogenizing device is a light pipe, a solid light pipe, a single-sided lens array or a double-sided lens array.

11. The solid-state light source projector of claim 9, wherein the second homogenizing device is a light pipe, a solid light pipe, a single-sided lens array or a double-sided lens array.

12. The solid-state light source projector of claim 9, wherein the reflective module comprises a diffuser.

13. The solid-state light source projector of claim 9, wherein the reflective module is a stationary, moving or rotating device.

14. The solid-state light source projector of claim 9, further comprising:

a third homogenizing device, disposed on another side of the light collecting module, and configured to homogenize the uniform light beams to generate a white light beam;

a third lens module, disposed on one side of the third homogenizing device, and configured to transmit the white light beam;

a prism module, disposed on one side of the third lens module, and configured to reflect the white light beam;

a digital micro-mirror device (DMD), disposed on one side of the prism module, and configured to modulate the white light beam to generate a modulated light beam; and a camera lens, disposed on another side of the prism module, and configured to output the modulated light beam;

wherein the modulated light beam is transmitted to the camera lens through the prism module.

15. The solid-state light source projector of claim 9, further comprising:

a third homogenizing device, disposed on another side of the light collecting module, and configured to homogenize the uniform light beams to generate a white light beam;

a third lens module, disposed on one side of the third homogenizing device, and configured to transmit the white light beam;

a prism module, disposed on one side of the third lens module, and configured to allow the white light beam to pass through;

a digital micro-mirror device (DMD), disposed on one side of the prism module, and configured to modulate the white light beam to generate a modulated light beam; and a camera lens, disposed on another side of the prism module, and configured to output the modulated light beam;

wherein the modulated light beam is reflected to the camera lens by the prism module.

16. The solid-state light source projector of claim 9, further comprising:

a penetrative panel module, disposed on another side of the light collecting module, and configured to modulate the uniform light beams to generate a modulated light beam; and a camera lens, disposed on one side of the penetrative panel module, and configured to output the modulated light beam.

17. The solid-state light source projector of claim 9, further comprising:

a concave mirror module, disposed on another side of the light collecting module, and configured to focus the uniform light beams to generate a focused light beam;

a digital micro-mirror device (DMD), disposed on one side of the concave mirror module, and configured to modulate the focused light beam to generate a modulated light beam; and a camera lens, disposed on one side of the DMD, and configured to output the modulated light beam.

\* \* \* \* \*